United States Patent [19]
Ronchese

[11] 3,835,295
[45] Sept. 10, 1974

[54] WATER HEATER

[76] Inventor: Aldo Ronchese, 20 Saint Johns Rd., Houghton, Johannesburg, South Africa

[22] Filed: Sept. 5, 1972

[21] Appl. No.: 286,427

[52] U.S. Cl.................. 219/314, 99/281, 99/288, 137/341, 200/84 R, 219/306, 219/333, 222/146 HE
[51] Int. Cl......... H05b 1/02, F24h 1/24, B67d 5/62
[58] Field of Search............................ 219/280–282, 219/296, 297, 306, 308, 309, 323, 324, 310, 312, 314, 327, 333; 99/281–283, 288, 305–307, 300; 137/341; 222/146 R, 146 H, 146 HE, 67; 200/84

[56] References Cited
UNITED STATES PATENTS

| | | | |
|---|---|---|---|
| 2,288,240 | 6/1942 | Herman | 219/314 X |
| 2,568,474 | 9/1951 | Van Sciver | 219/333 UX |
| 2,926,234 | 2/1960 | Palmer | 219/314 |
| 3,420,411 | 1/1969 | Ronchese | 219/306 UX |
| 3,693,535 | 9/1972 | Abel | 219/314 X |

Primary Examiner—A. Bartis
Attorney, Agent, or Firm—Burns, Doane, Swecker & Mathis

[57] ABSTRACT

A water heater for heating predetermined variable quantities of water and dispensing the exact predetermined quantity at substantially the boiling temperature includes a heating compartment having its bottom connected to the top of a second compartment. A heating element is provided in the heating compartment. The heating compartment is connected to a constant level water supply means. A movable float in the heating compartment is latched in a first position whereby it displaces a predetermined quantity of water. The float can be released for movement to a selected second position determined by a variable stop means wherein the quantity of water displaced by the float is decreased. The selected second position determines the quantity of water to be heated. Movement of the float from the first to the second position activates a switch to energize the heating element. The heated water is transferred through a passage from the bottom of the heating compartment into the upper part of the second compartment and may be then dispensed from the second compartment through a siphonic dispenser.

14 Claims, 7 Drawing Figures

PATENTED SEP 10 1974

PATENTED SEP 10 1974

WATER HEATER

THIS INVENTION relates to water heaters and more particularly to apparatus whereby a predetermined quantity of water can be heated to boiling point in a short space of time.

Apparatus of the kind above referred to is widely used for the preparation of beverages such as tea, coffee, hot chocolate and the like. It is desirable in this type of apparatus that the water be dispensed substantially at boiling point and it is an object of the present invention to provide a water heater which can give an output of boiling water and which does not require thermostatic controls for this purpose.

According to this invention there is provided a water heater comprising a closed container body divided into two compartments, a passage connecting the bottom of one compartment to the top of the other, a vent and an outlet from the latter and a heating element in the former, a connection for a constant level water supply to the compartment with the heating element and means for supplying power to the heating element.

The invention also provides an automatically operated switch for the power supply, the switch comprising a float in the compartment with the heating element and an upwardly projecting stem having a self-locking latch mechanism and a control associated therewith and means for limiting the upward movement of the float.

The invention further provides for the water supply to be a closed reservoir with an outlet dip tube having its lower end at a predetermined position, for the vent to be one or more tubes upstanding into the compartment and opening outwardly adjacent the outlet from the body and for siphonic control of the latter.

Other features of this invention will become apparent from the following description of a preferred embodiment of the invention and particular reference is made in this regard to the stand and heating element.

Figure 1:
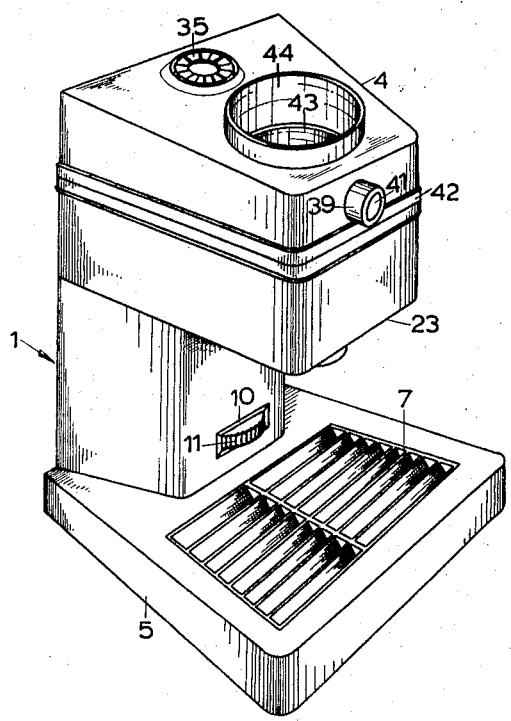
FIG. 1 is a perspective view of the complete water heater.
Figure 2:
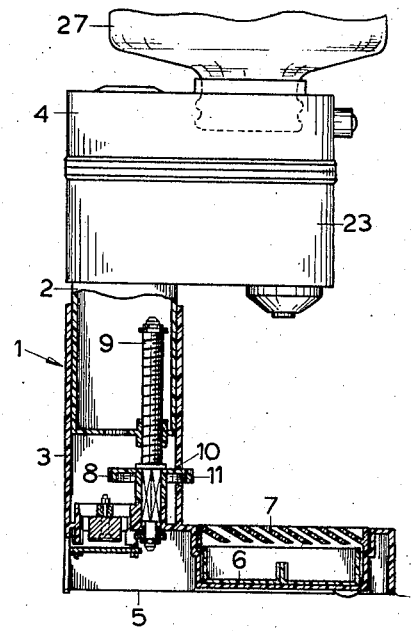
FIG. 2 is a part-sectional side elevation of the unit.

As illustrated, the water heater comprises a base 5, a stand 1, a container body 12, a closure member 42 and a cover 4. The stand 1 is formed by a part 3 integral with the base and a part 2 integral with a shield 23 which houses the body 12. The part 2 is in telescopic engagement within the upper portion of part 3.

The parts may be moved relative to each other by rotation of nut 8 on a screw threaded spindle 9, each of these components being associated with either part 2 or 3. The part 3 has a window 10 and the edge 11 of nut 8 projects through this window so that it can be easily manipulated to revolve the spindle and thereby cause the parts 2 and 3 to extend from one another or retract into each other.

The stand provides a flat back surface together with the base 5, shield 23 and cover 4, thereby enabling the unit to be mounted against a wall. Thus the unit can be either secured to a wall bracket or can be free-standing on its base 5.

The unit, as far as practicable, will be made from parts moulded in suitable synthetic resin material. The base has a recess formed therein which contains a removable drip tray 6 of sufficient size to hold between two and three average sized cups of water. The tray is provided with suitable formations to enable it to be easily handled and cover in the form of a louvred grid 7 is fitted over the tray 6 to form a support for a vessel.

Figure 6:
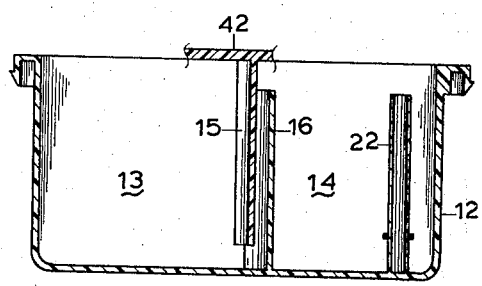
FIG. 6 is a sectional elevation of the body on line B—B in FIG. 5.

The top of the stand thus supports the container body 12 of the water heater and the body is divided into two separate compartments 13, 14. The dividing walls 15, 16 are arranged to provide a passage between them extending from the bottom of compartment 13 into the top of compartment 14. The dividing wall 16 is moulded integrally with the body 12 and the dividing wall 15 with the closure member 42. When the latter is in position on the body the dividing walls thus provide said passage as is clearly shown in FIG. 6.

Part of this passage is blocked off so that a tubular portion 17 is formed which opens at its lower end into compartment 13. At its upper end the tubular portion 17 opens into a socket 43 formed in the closure member 42. The socket 43 is extended upwardly by a flange 44 of the cover 4, which flange engages the uppermost edge of the socket 43.

The compartment 14 has an outlet 19 which preferably has a siphon 20 associated therewith and a pair of vent pipes 21, 22 open through the base of compartment 14, one on each side of the outlet 19. There is a shield 23 around the vent opening and the outlet so that any discharge through the vent pipe 21, 22 occurs close to the outlet 19 and appears to come therefrom. As shown, the shield 23 is formed integrally with the portion 2 of the stand and houses the container body 12.

The siphon 20 is preferably supported by the vent pipes 21, 22 and maintained in position by a rod 45 extending from the closure member 42 downwardly.

The flange 44 of the cover 4 is adapted to support a reservoir bottle 27 with its mouth projecting into the socket 43 of the closure member 42. A dip tube 24 is sealed to the mouth of the bottle 27 and extends into the tubular portion 17 to a predetermined depth. The dip tube includes a simple non-return valve indicated at 28 and which is opened automatically by the pintle 29 when the bottle is in the engaged position.

The closure member 42 also supports the stem 30 on the lower end of which is mounted the float 31 which is normally enclosed in compartment 13. The upper end of the stem projects above the closure member and carries a collar 32 which is located to engage and operate the control lever 33 of a micro-switch 34 which is in turn connected in an electrical supply circuit for the water heater.

The stem 30 is made hollow with the lower end communicating with the interior of the float 31 so that the latter is always under atmospheric pressure.

A rotatable stop member 35 is mounted above the upper end of stem 30 and has an inclined lower surface 36 against which the stem abuts when the float is raised. Thus, by varying the orientation of member 35 relative to stem 30, the float can be allowed to lift to a greater or lesser extent in the compartment 13. It will be appreciated that the lower end of the dip tube 24 determines the level to which water can discharge from the reservoir bottle 27 into the compartment 13. But the lower the float is depressed into compartment 13 when the stem is in contact with the stop member 35 the less will be the volume of water in the container and thus by rotating the member 35, this volume can be adjusted to meet particular requirements.

The collar 32 of the stem 30 is arranged to co-operate with a formation 50 of a spring loaded latch mechanism 38. The mechanism 38 is suitably spring loaded so that it may be rotated to release the collar 32 and allow upward movement of the stem 30, by depression of a finger button 39 which is connected through a simple linkage system to the mechanism 38.

The latch mechanism is furthermore provided with an inclined surface 47 which is arranged to co-operate with a roller 48 located on the end of the control lever 33. The latter is spring loaded upwardly so that when the finger button is depressed, the roller rides along said inclined surface, which action causes the micro-switch to close. The inclined surface terminates in a transverse stop surface 49 alongside the formation 50 against which the roller comes to rest. In this position of the roller the control lever maintains the micro-switch in the closed position and the latch mechanism in its open position.

Figure 4:
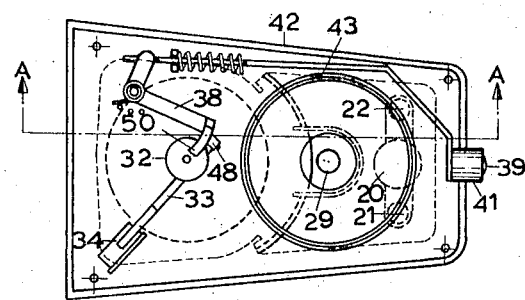
FIG. 4 is a plan view of the closure member showing the latch mechanism and switch.
Figure 7:
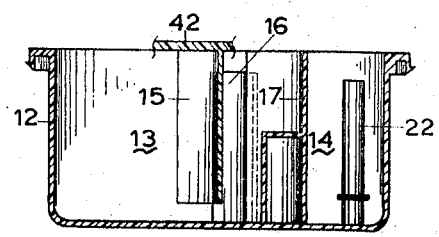
FIG. 7 is a similar view of the body on line A—A in FIG. 5.
Figure 3:
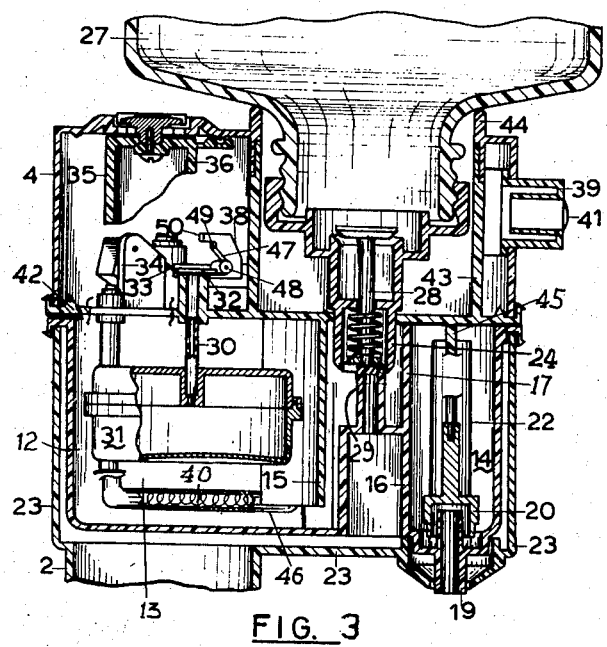
FIG. 3 is a sectional elevation of the two compartments, the float and the closure member in their normal assembled positions.
Figure 5:
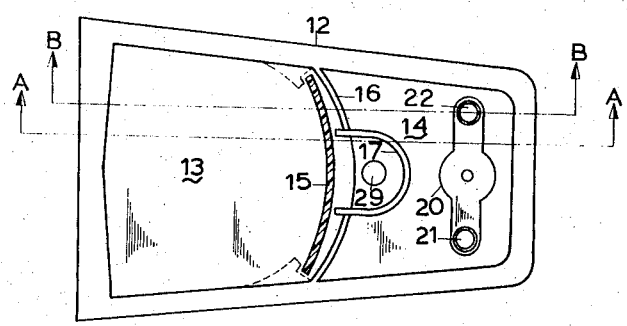
FIG. 5 is a plan view of the container body showing the two compartments.

Upon downward movement of the stem 30, the collar 32 engages the control lever and consequently disengages the roller 48 from said stop surface. This enables the latch mechanism to rotate to its closed position under the action of its spring loading. Thus, the weight of the float 31 together with the spring loaded action of the latch mechanism force the control lever downwardly to open the micro-switch. In its lowest position the collar prevents upward movement of the control lever (see FIGS. 3 and 4). Should the finger button be depressed and the float not rise as a result of its lack of buoyancy, the collar will prevent the control lever from closing the micro-switch. This is necessary to prevent the element 40 being energised without there being water in the compartment 13.

In circuit with the switch is a powerful heating element 40 and an indicating lamp 41 (see FIG. 1). The heating element is chosen to be of the order of 2,200 watts. The element is preferably a known bare wire coiled element located within a copper tube 46.

In use, the reservoir bottle is filled and inverted into position into the socket 43 and the pintle 29 will open the valve indicated 28 and keep it open.

THe float 31 will have fallen to a position with the collar 32 located beneath the latch mechanism 38 and with the micro-switch 34 in its normally open position. The water will thus flow from bottle 27 until it reaches the lower end of dip tube 24.

The float will consequently rise until the collar 32 engages the latch mechanism 38. In this position the volume of water in the compartment will be less than the minimum of water required.

The heater is now in a condition ready for use.

When it is desired to obtain a cup of water at a temperature substantially at boiling point, the finger button 39 is depressed to release the float 31 which rises immediately to allow some more water to enter compartment 13 while simultaneously allowing closure of switch 34. The volume of water in the compartment now equals the required amount.

The powerful heating action of the element causes fast and vigorous boiling of the water in compartment 13. This results in a pressure build-up above the water surface which causes the boiling water to surge through the passage into compartment 14. The pressure also prevents cold water from entering the compartment 13 from the bottle 27.

When the water reaches the appropriate level in compartment 14, it flows through the siphonic outlet while the air and steam can escape through the vents.

It will be understood that the shield causes the steam and water to appear as if emerging from the same tube which is a pleasing effect. Also, the use of a siphonic outlet ensures a quick and complete cut off of the flow at the end of the discharge.

The time taken between the depression of the button and dispensing of the measured quantity of boiling water can be made to be as little as fifteen seconds depending on the temperature of the water supply.

As soon as the water level in the compartment 13 drops sufficiently, the float also drops. By the time the water is exhausted from compartment 13 the collar 32 has opened the switch 34, cutting off power to the element. At the same time, the latch mechanism has rotated to its closed position in which the formation 50 prevents upward movement of the float 31 beyond the predetermined amount.

Once the pressure inside the compartment 13 drops, water once more flows from the bottle 27 until it reaches the lower end of the dip tube.

It will be noted that with the above arrangement, cold water does not mix with the heated water. This is advantageous insofar as the discharged water is required to be as near as possible to boiling point. The purpose of bringing the water to be discharged to its required volume only after depression of the finger button, is dual. Firstly, it allows said volume to be lessened by adjustment of the stop member 35 prior to operation of the unit which would otherwise not be possible. Secondly, it eliminates the possibility of different volumes of water being discharged with the same setting of the apparatus as a result of fluctuation in the level of the water relative to the dip tube due to fluctuation in atmospheric conditions. With the above arrangement the discharge volume will not be affected by atmospheric conditions because the dip tube principle is in effect applied immediately prior to discharge.

Since the float 31 is open to atmosphere through stem 30, there is no pressure stresses induced therein by the sudden changes of temperature of its surroundings.

It will be noted that the heater cannot be operated until there is sufficient water because the float will not allow operation of the switch 34.

The manufacture of most of the parts from synthetic resin material ensures that good heat and electrical insulating properties for the compartments are included in the unit.

As an added precaution to the safety of the heater, a cut-out thermostatically controlled switch can be included in the circuit which will operate to break the electrical supply when the element reaches a temperature a predetermined amount above normal operating conditions. Alternatively, a spring loaded mechanical device may be used in conjunction with a contact or the like, which device is maintained in an inoperative position by a low melting point metal in contact with the heating element.

It is mentioned that a further advantage of the extensible stand, other than allowing for comfortable use with different heights of drinking vessels, is that it enables the unit to be packed for storage and transport with the bottle 27 located between the base 5 and the body 12. This both holds the bottle and affords useful protection therefor.

The cover 4 serves the purpose of protecting the switch 34 and latch mechanism and of giving an aesthetically attractive overall appearance to the heater as can be seen from FIG. 1 of the drawings. The heater is simple and effective in operation and utilises power only when hot water is required.

What I claim as new and desire to secure by Letters Patent is;

1. A water heater comprising a heating compartment, a passage connecting the bottom of the heating compartment to the top of a second compartment, a heating element in the heating compartment and an outlet from the second compartment, means for supplying a constant level water supply to the heating compartment, selectively movable means within the heating compartment for displacing a predetermined first volume of water within the heating compartment when in a first position in said compartment and movable to a second position in said compartment wherein it displaces a volume less than said first volume, means cooperative with said displacing means for constraining movement of said selectively movable means from said first to said second position, means cooperative with said displacing means for limiting movement of said displacing toward said second position, means for releasing said constraining means whereby said displacing means can move to said second position thereby to control, in coordination with said water supplying means, the volume of water displaced within the heating compartment between said predetermined first volume and a preselectable second volume less than said first volume, and, means activated by said displacing means for supplying power to the heating element in coordination with the decreasing of displaced water from the first volume to the second volume, a desired volume of water to be heated in the heating compartment being thereby preselectable immediately prior to heating.

2. A water heater as claimed in claim 1 in which said displacing means comprises a float having a stem projecting through the top of said heating compartment, said limiting means cooperative with the displacing means comprising a stop member outside the compartment, the stop member being arranged to limit upward movement of the float to establish said second position to thereby determine said second volume.

3. A water heater as claimed in claim 2 in which the power supplying means is an electrical supply through a switch located to be operated by a collar on the float stem.

4. A water heater as claimed in claim 3 wherein said releasing means comprises a latch mechanism to maintain the float in a position in its compartment lower than that determined by the stop member, the collar on the float stem serving to maintain the switch in an open position when the float is in its lowest position, and a means operable to release the latch mechanism allowing the float to rise from its lowest position.

5. A water heater as claimed in claim 2 in which the stop member is adjustable to enable the upper position of the float to be varied.

6. A water heater as claimed in claim 2 in which the float stem is hollow and connects the inside of the float to atmosphere.

7. A water heater as claimed in claim 1 in which the second compartment outlet is a siphonic outlet.

8. A water heater as claimed in claim 7 including a vent from the second compartment which opens downwardly adjacent the outlet and a shield positioned around the outlet and over the vent opening.

9. A water heater as claimed in claim 1 in which the water supply means is a closed reservoir having a mouth and a dip tube connected to said mouth, the dip tube having its lower end opening into the heating compartment and at a predetermined height above the bottom of the compartment.

10. A water heater as claimed in claim 9 including a non-return valve in the dip tube.

11. A water heater as claimed in claim 1 including a stand on which the said heating and second compartments are mounted, said stand containing a means to vary the stand height and having a drip tray located below the outlet of the second compartment.

12. A water heater as claimed in claim 11 in which the stand has a flat back surface adapted to allow the heater to be mounted on a wall.

13. A water heater comprising a heating compartment, a heating element in said heating compartment, means for supplying said heating compartment with water at a constant level, a float in said heating compartment, means for latching said float in a lower position such that the float displaces a first volume of water in said lower position and tends to move upwardly with water in said heating compartment at said constant level, means for releasing said latching means, said float moving upwardly in response to the release of said latching means and thereby displacing a second volume of water less than said first volume of water, means for preselecting said second volume of water including means for constraining the upward movement of said float at a preselectable upper position above said lower position, means for energizing said heating element in response to upward movement of said float, and water discharge means for discharging heated water from said heating compartment.

14. A water heater comprising a heating compartment, a passage connecting the bottom of the heating compartment to the top of a second compartment, a heating element in the heating compartment and an outlet from the second compartment, means for supplying a constant level water supply to the heating compartment, movable displacement means within the heating compartment for displacing a predetermined first volume of water within the heating compartment, means cooperative with said displacing means for moving said displacement means to a selected second position to thereby decrease the volume of water displaced within the heating compartment to a preselectable second volume less than said first volume, and, means activated by movement of said displacing means for supplying power to the heating element in coordination with the decrease in displaced water from the first volume to the second volume, a desired volume of water to be heated in the heating compartment being thereby preselectable immediately prior to heating.

* * * * *